Dec. 22, 1964  H. F. BISHOP ETAL  3,161,928
WELDING APPARATUS AND PROCESS
Filed Jan. 16, 1962
FIG. 1
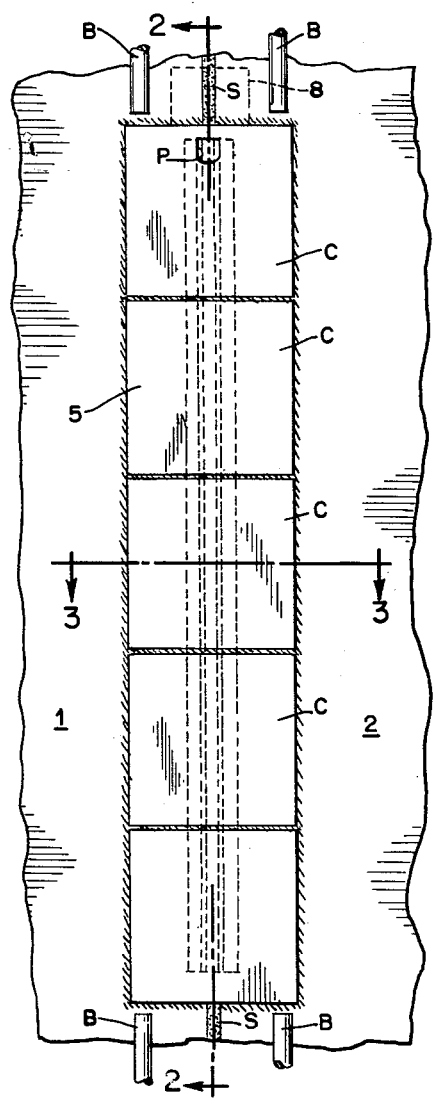
FIG. 2
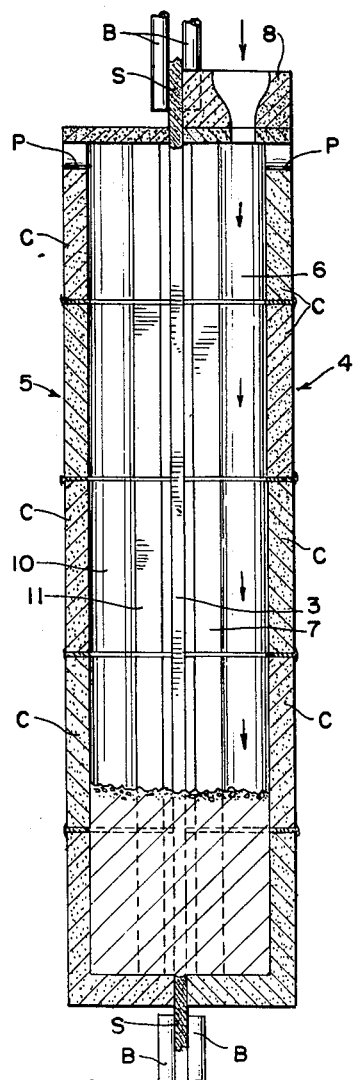
FIG. 3
FIG. 4
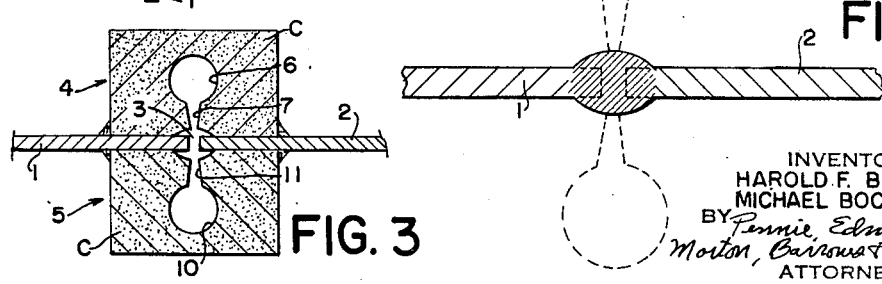
INVENTORS
HAROLD F. BISHOP
MICHAEL BOCK II
BY Pennie, Edmonds
Morton, Barrows & Taylor
ATTORNEYS

United States Patent Office 3,161,928
Patented Dec. 22, 1964

3,161,928
WELDING APPARATUS AND PROCESS
Harold F. Bishop and Michael Bock II, Conneaut, Ohio, assignors to Exomet Incorporated, Conneaut, Ohio, a corporation of Ohio
Filed Jan. 16, 1962, Ser. No. 162,420
9 Claims. (Cl. 22—116)

This invention relates to the welding of metal plates, and has for its object the provision of a novel arrangement of apparatus and a process for welding together metal plates in relatively long lengths of weld. The invention makes it possible to weld together metal plates which may be flat or curved, in end-to-end relation and in substantial lenghts, for example, each weld section in about five foot lengths.

This invention is based on the discovery of a gating and flow system by means of which very hot metal is poured into and through a narrow gap between the plates to fuse the metal of the plates into a unitary structure with the metal which has flowed between the plates. The invention provides a gating and downflow and overflow system for carrying very hot metal to the weld gap between the plates which provides a reservoir of heat for preheating and fusing the plates and the washing away and removal from the weld of objectionable impurities, resulting in welds of exceptional uniformity and soundness.

The apparatus of the invention comprises two sprue units formed of rigid core materal, preferably of identical construction, and secured on opposite sides of the weld gap. Each unit comprises a sprue, one a down sprue and the other an overflow sprue, of relatively large cross-section, contiguous throughout its length with a gate overlying the gap, one being an ingate, and the other an outgate. The units are preferably formed of several cores joined together.

The invention is preferably carried out by securing the plates in an upright position whether they be large flat plates or curved plates, for example, of a large tank or kiln. The sprues are preferably formed of a stack of cores that are arranged over each other along each side of the weld gap. The cores may be preformed of sodium silicate bonded sand or similar refractory core material. The cores when arranged on each side of the plates provide sprue units each having a sprue of relatively large cross-section, one for the down flow of metal and the other for the overflow of metal, extending the length of the weld gap. The contiguous ingates and outgates have relatively narrow cross-sections, preferably narrower than the gap over which they are superimposed.

The metal is poured into the down sprue and flows to the bottom, through the ingate, the gap, the outgate and through the overflow sprue.

The accompanying drawings illustrate an embodiment of apparatus of the invention.

FIG. 1 is a side view of plates and a sprue unit on the ingate-down sprue unit side;
FIG. 2 is a sectional view at 2—2 of FIG. 1;
FIG. 3 is a sectional view at 3—3 of FIG. 1, and
FIG. 4 is a sectional view at 3—3 of FIG. 1 on an enlarged scale with the sprue units removed.

The plates 1 and 2, either curved or flat, usually of steel, are secured together by clamps or brackets B and held apart to provide the gap 3, which is about ⅜ inch wide for one inch plates. The down sprue unit 4 on one side and the overflow sprue unit 5 on the opposite side are of identical construction and are advantageously formed by stacking a series of hard cores C formed of sand and sodium silicate binder or equivalent core material. The down sprue unit 4 has a down sprue 6 of relatively large cross-section for receiving and holding the molten metal. This down sprue is contiguous with a relatively narrow ingate 7 throughout its length which overlies the gap 3. A metal pouring cup 8 is located above the down sprue 6 to pour the metal therein. The overflow sprue unit 5 has an overflow sprue 10 of relatively large cross-section which is contiguous throughout its length with the narrow wedge-shaped outgate 11 lying directly over the gap 3.

In assembling the units around the flat plates (or a large curved vessel) the cores are pasted, for example, with sodium silicate paste, onto the plates and also to each other at the points where they join. The cores may also be preassembled in angle iron frames so that the whole assembly can simply be placed in position and bolted onto the plates. In order to contain the metal in the gap, the top and bottom of the gap are plugged with molding sand S.

In carrying out a process of the invention for welding steel plates, very hot metal at a temperature of at least 4000° F. is supplied to the cup 8 as from an electric furnace or a thermite reaction (not shown). The process requires very hot metal which, for steel welding, is preferably at least 700° F. above the melting point of the steel. It is the usual practice in steel melting operations to employ temperatures of about 3300° F. However, an electric furnace can heat the metal to temperatures much higher if desired. In our process it is advantageous to use thermite metal which can easily be heated to as high as 4000° F. or higher if desired. In our preferred practice we add steel punchings or an alloying metal such as nickel shot in order to hold the temperature down to a lower level of about 4000° F. Since we have found that the metal resulting from a thermite reaction can have the desired temperature and composition, we shall describe the process with reference to such metal.

The following examples illustrate metal-producing exothermic material for forming the welds:

*Example I*

| | Percent |
|---|---|
| Steel punchings | 11.7 |
| FeMn (L.C.) | 1.5 |
| CaSi | .5 |
| Mill scale | 64.0 |
| Al #122 | 18.9 |
| NiO | 1.5 |
| Fluospar | 1.9 |

*Example II*

| | Percent |
|---|---|
| Cast iron shot | 5.8 |
| Steel punchings | 5.9 |
| FeMn (Std.) | 1.5 |
| CaSi | .5 |
| Ball-milled scale | 64.0 |
| Al #122 | 18.9 |
| Nickel oxide | 1.5 |
| Fluospar | 1.9 |

*Example III*

| | Percent |
|---|---|
| Cast iron shot | 5.8 |
| Steel punchings | 5.8 |
| FeMn | 1.5 |
| CaSi | .5 |
| Mill scale | 64.6 |
| Al #122 | 19.9 |
| Fluospar | 1.9 |

The advantages of using the thermite reaction to produce the weld metal, aside from the ease of producing high temperatures, is the rapidity with which the molten metal can be produced and the fact that no electric or gas power source is required. The thermite metal can be easily made into any desired composition either by adding the desired alloy oxides or by adding pure alloying metal such as nickel. For steel welding we form thermite weld metal containing about 1% nickel to improve the mechanical properties.

The exothermic composition is reacted in a crucible suspended above the cup 8. About 30 seconds after the composition is ignited, the reacted metal is tapped from the bottom of the crucible, enters the pouring cup above the down sprue 6, and flows to the bottom of the down sprue 6. The hot, molten metal flows through the wedge-shaped ingate 7 and washes over the edges of the plates 1 and 2 that form the weld cavity or gap 3. Then the metal flows through the wedge-shaped outgate 11 on the other side of the gap into the overflow sprue 10 which serves as an overflow cavity. In so doing the metal washes impurities away from the edges of the plates at the gap and thoroughly preheats these edges so that, when the metal finally comes to rest in the gap between the edges of the plates, it forms a completely fused, sound weld. This flow-through process is continuous from the bottom to the top of the assembly as tapping from the crucible reaction vessel progresses. After the metal has solidified and cooled, the sand cores from each side of the plate are broken off with a hammer leaving the cast metal and weld as shown in FIGS. 3 and 4. Due to the wedge-shaped shape of the ingate and outgate sections, it is possible to flogg off the down sprue and the overflow sprue. This is all that needs to be done to effect a good joint, although it may be preferable to grind the rough edges where the gates are broken from the weld as shown in FIG. 4.

We prefer to have an overflow at the top of the sprue units on both sides of the plate as shown by the ports P. This permits any entrapped slag or dirt, which will naturally rise, to flow out of the weld area.

In welding long sections of welds such as wide plates, say, over five feet wide, or large diameter tanks, say, 15 feet in diameter or more, we may make the welds in sections of about five feet or more.

The invention prevents overheating and melting of an undesired amount of the edges of the plates at the gap, enables impurities to escape from the weld and the sprue metal can easily be removed. The sprue metal provides a reservoir of heat which preheats and fuses the plates and aids in annealing the weld area. The tapered shape of the ingate and the outgate, being narrow and wedge-shaped, permits the sprues to be knocked off with a hammer. The continuous upright positions of the sprues and gates enables one to pour the weld from the bottom to the top while washing away impurities and dirt.

We claim:

1. Apparatus for welding metal plates in edge-to-edge engagement which comprises two plates arranged in an upright position with a gap between the edges to be welded, a rigid sprue unit attached to each of the two opposite sides of the plates, the sprue unit on one side having a down sprue extending the length of the gap and a narrow ingate contiguous with the down sprue and adjacent the gap, the sprue unit attached to the opposite side of the plates having an overflow sprue and a contiguous narrow outgate adjacent the gap, means closing ends of the gap to prevent loss of metal, and means for flowing metal into the top of the down sprue to fill the gap and cause metal to overflow the overflow sprue.

2. Apparatus according to claim 1 which comprises sprue units formed to engage a curved plate surface.

3. Apparatus according to claim 1 which comprises sprue units formed of a plurality of core sections connected together and secured to the plates.

4. Apparatus according to claim 1 which comprises sprue units having ingates and outgates which are narrow and wedge-shaped.

5. The process for welding metal plates together which comprises securing two plates spaced apart to provide a gap for receiving molten metal, securing a sprue unit to each of the two opposite sides of the plates over the gap, the sprue unit on one side of the plates having a down sprue and an ingate and the sprue unit on the opposite side having an overflow sprue and an outgate, flowing molten metal into the down sprue, through the ingate, through the gap, through the outgate and through and out of the overflow sprue, and fusing the ends of the plates to the metal in the gap to form the weld.

6. The process of claim 5, which comprises securing steel plates and flowing steel into the down sprue at a temperature of about 4000° F.

7. The process of welding together steel plates in edge-to edge position and in substantial lengths of weld in a single operation which comprises securing two plates in alignment and in an upright position with a gap between adjacent edges for welding, applying over opposite sides of the plates and over the gap sprue units one of which has a down sprue for receiving molten steel and an ingate located over and along the gap, the other sprue unit having an outflow sprue and a connecting outgate located over the gap pouring molten steel at a temperature considerably above its melting point into the downflow sprue, through the ingate, the gap, the outgate and into the overflow sprue, and after solidification removing the sprue units and the metal of the sprues.

8. In the process of claim 7, pouring molten steel into the down sprue at a temperature of about 4000° F.

9. In the process of claim 7 using a thermite mixture containing particles of metal to result in molten steel at a temperature of about 4000° F.

References Cited by the Examiner

UNITED STATES PATENTS

| 1,097,848 | 5/14 | Custer | 22—134 |
|---|---|---|---|
| 2,063,815 | 12/36 | Lewis | 22—209 |
| 2,294,886 | 9/42 | Angel | 22—204 |
| 2,469,062 | 5/49 | Begtrup | 22—116 |
| 2,870,499 | 1/59 | Burke | 22—205 |

FOREIGN PATENTS 860,999 12/52 Germany.

MICHAEL V. BRINDISI, *Primary Examiner.*